(12) United States Patent
Mack et al.

(10) Patent No.: US 11,230,479 B2
(45) Date of Patent: Jan. 25, 2022

(54) SYSTEM AND METHOD FOR THE TREATING OF WATER BY REVERSE OSMOSIS OR NANOFILTRATION

(71) Applicant: Veolia Water Solutions & Technologies Support, Saint-Maurice (FR)

(72) Inventors: Bernard Roy Mack, Natick, MA (US); Dale L. Wynkoop, Dublin, OH (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 181 days.

(21) Appl. No.: 16/474,604

(22) PCT Filed: Jan. 8, 2018

(86) PCT No.: PCT/US2018/012766
§ 371 (c)(1),
(2) Date: Jun. 28, 2019

(87) PCT Pub. No.: WO2018/129442
PCT Pub. Date: Jul. 12, 2018

(65) Prior Publication Data
US 2019/0322548 A1 Oct. 24, 2019

Related U.S. Application Data

(60) Provisional application No. 62/444,061, filed on Jan. 9, 2017.

(51) Int. Cl.
*B01D 61/06* (2006.01)
*B01D 61/12* (2006.01)
*C02F 1/44* (2006.01)

(52) U.S. Cl.
CPC .............. *C02F 1/442* (2013.01); *B01D 61/06* (2013.01); *B01D 61/12* (2013.01); *C02F 1/441* (2013.01);
(Continued)

(58) Field of Classification Search
CPC ............ B01D 2311/04; B01D 2311/25; B01D 2311/06; B01D 2311/165;
(Continued)

(56) References Cited

U.S. PATENT DOCUMENTS 7,578,919 B2  8/2009  Pitts et al.
7,767,077 B2  8/2010  Yoneda et al.
(Continued)

FOREIGN PATENT DOCUMENTS

CN   101092259 A   12/2007
CN   202228252 U   5/2012
(Continued)

OTHER PUBLICATIONS

English language machine translation of EP0599281, 20 pages, no Date.*

*Primary Examiner* — Pranav N Patel
(74) *Attorney, Agent, or Firm* — Coats & Bennett, PLLC

(57) ABSTRACT

The present invention relates to a system and process for treating a feedwater wherein the system includes at least one RO or nanofiltration unit that receives a feed under high pressure and produces a concentrate that is directed to and held at low pressure in a concentrate accumulator. Generally the permeate or the inlet feedwater is maintained at a constant flow rate. Periodically the system is switched from a mode 1 or normal operating process to a mode 2 where the concentrate is drained from the concentrate accumulator. However, in mode 2, the feedwater is still directed into the
(Continued)

system and through the RO or nanofiltration unit which produces the permeate and the concentrate.

9 Claims, 4 Drawing Sheets

(52) U.S. Cl.
CPC ...... *B01D 2311/04* (2013.01); *B01D 2311/06* (2013.01); *B01D 2311/165* (2013.01); *B01D 2311/243* (2013.01); *B01D 2311/246* (2013.01); *B01D 2311/25* (2013.01); *B01D 2313/50* (2013.01); *C02F 2209/001* (2013.01); *C02F 2209/003* (2013.01); *C02F 2209/03* (2013.01); *C02F 2209/05* (2013.01); *C02F 2209/40* (2013.01); *C02F 2301/08* (2013.01); *C02F 2303/10* (2013.01)

(58) Field of Classification Search
CPC ........ B01D 2311/243; B01D 2311/246; B01D 61/02; B01D 61/025; B01D 61/027; B01D 61/06; B01D 61/08; B01D 61/12; B01D 2313/50; B01D 2313/246; C02F 1/441; C02F 1/442; C02F 2209/001; C02F 2209/003; C02F 2209/03; C02F 2209/05; C02F 2209/40; C02F 2301/08; C02F 2303/10; Y02W 10/30
See application file for complete search history.

(56) References Cited

U.S. PATENT DOCUMENTS

| | | | |
|---|---|---|---|
| 8,518,252 B1* | 8/2013 | Li | C02F 9/00 210/257.2 |
| 9,387,440 B2 | 7/2016 | d'Artenay et al. | |
| 2007/0295650 A1 | 12/2007 | Yoneda et al. | |
| 2011/0290723 A1* | 12/2011 | Bonnelye | B01D 61/22 210/636 |
| 2012/0205307 A1 | 8/2012 | Boudinar | |
| 2017/0354930 A1* | 12/2017 | Kitamura | C02F 1/008 |
| 2018/0345221 A1* | 12/2018 | Shmidt | B01D 61/027 |

FOREIGN PATENT DOCUMENTS

| | | | |
|---|---|---|---|
| CN | 103237592 A | 8/2013 | |
| CN | 103827492 A | 5/2014 | |
| CN | 204918085 U | 12/2015 | |
| DE | 19922628 C1 | 5/2001 | |
| EP | 0599281 A2 | 6/1994 | |
| EP | 2394964 A1 | 12/2011 | |
| KR | 20140128496 A | 11/2014 | |
| RU | 2473472 C2 | 1/2013 | |
| WO | 2010052651 A1 | 5/2010 | |
| WO | 2015141693 A1 | 9/2015 | |

* cited by examiner

SYSTEM AND METHOD FOR THE TREATING OF WATER BY REVERSE OSMOSIS OR NANOFILTRATION

RELATED APPLICATIONS

The present application is a U.S. National Stage Application of PCT Application No. PCT/US2018/012766, with an international filing date of Jan. 8, 2018. Applicant claims priority based on U.S. Patent Application No. 62/444,061 filed Jan. 9, 2017. The subject matter of these applications is incorporated herein in their entirety.

FIELD OF THE INVENTION

The present invention relates to systems and processes that use reverse osmosis or nanofiltration membranes to remove dissolved solids from a feedwater.

BACKGROUND OF THE INVENTION

Reverse osmosis (RO) or nanofiltration is generally conducted in a steady state operation. Permeate flow is restricted to a relatively narrow band of operation and the concentrate flow is limited by the requirements for crossflow within the membrane module. This leads to numerous limitations within the membrane operation systems. For example, to increase the recovery, additional stages of membranes are required. Generally, one can expect a 50% recovery per stage. Thus, to achieve a 75% recovery, two stages are required and three stages will permit recovery to 85%. In cases where additional stages are employed, this frequently leads to the need for additional pumping or energy management to control the flux rate of water through reverse osmosis membranes.

SUMMARY OF THE INVENTION

The present invention relates to a system and process for treating a feedwater that employs one or more reverse osmosis or nanofiltration modules that can achieve high water recovery with either: (1) constant permeate flow; (2) constant feed flow; or (3) variable permeate delivery depending on the requirements as water demand varies.

In one embodiment, a membrane system and process is disclosed for treating a feedwater. The system includes one or more stages of a reverse osmosis or nanofiltration unit for treating the feedwater. The RO or nanofiltration unit produces a permeate and a concentrate. Two pressure zones are included in the system—a low pressure zone and a high pressure zone. Feed to the RO or nanofiltration unit is conducted at high pressure. In one embodiment, a high pressure pump is utilized to pump a mixture (the feed) of feedwater, permeate and concentrate to and through the RO or nanofiltration unit. The concentrate is directed to a concentrate tank or accumulator where the concentrate is held under low pressure. During this time, the permeate or inlet feedwater flow is controlled so as to maintain the flow rate of the permeate or the inlet feedwater generally constant. This process is carried out in what is referred to as a first mode. In a second mode, a portion of the concentrate accumulated in the concentrate accumulator is drained while still supplying feedwater to the system and producing the permeate and concentrate.

In another embodiment, the present invention entails a process of treating a feedwater in a system including a reverse osmosis or nanofiltration unit and a concentrate accumulator. The process includes two modes of operation, a first mode and a second mode. In the first mode of operation, the process includes pressurizing the feedwater and directing the feedwater through the RO or nanofiltration unit to yield a permeate and concentrate. The concentrate is directed from the RO or nanofiltration unit to the concentrate accumulator. Concentrate from the accumulator is pumped to and through the RO or nanofiltration unit. The permeate exiting the RO or nanofiltration unit is split into a first permeate stream and a second permeate stream. The first permeate stream is directed to a delivery point while the second permeate stream is recycled through the RO or nanofiltration unit. In the second mode of operation, the process entails removing a portion of the concentrate from the concentrate accumulator while still directing the pressurized feedwater and recycled second permeate stream through the RO or nanofiltration unit and directing the concentrate from the RO or nanofiltration unit to the concentrate accumulator.

Also, the present invention entails a membrane system for treating feedwater. In one embodiment, the system comprises an RO or nanofiltration unit configured to produce a permeate and a concentrate. In addition, there is provided a permeate delivery line for directing a first portion of the permeate to a delivery point. There is also provided a permeate recycle line configured to receive a second portion of the permeate. Also, the system includes a concentrate accumulator. Further, there is provided a concentrate line operatively connected between the RO or nanofiltration unit and the concentrate accumulator for directing concentrate from the RO or nanofiltration unit to the concentrate accumulator. Furthermore, a pump is provided and located upstream of the RO or nanofiltration unit. A concentrate feed line is operatively connected between the concentrate accumulator and the pump for conveying concentrate from the concentrate accumulator to the pump. There is also provided an RO or nanofiltration feed line operatively connected between the pump and the RO or nanofiltration unit. A first feedwater supply line is configured to contain the feedwater to be treated. The permeate recycle line, first feedwater supply line and the RO or nanofiltration feed line are configured such that the concentrate, feedwater and the second portion of the permeate are combined and pumped to the RO or nanofiltration unit. There is also provided a concentrate drain line operatively associated with the concentrate accumulator for draining concentrate from the concentrate accumulator.

Other objects and advantages of the present invention will become apparent and obvious from a study of the following description and the accompanying drawings which are merely illustrative of such invention.

DESCRIPTION OF EXEMPLARY EMBODIMENTS OF THE PRESENT INVENTION

Figure 1:
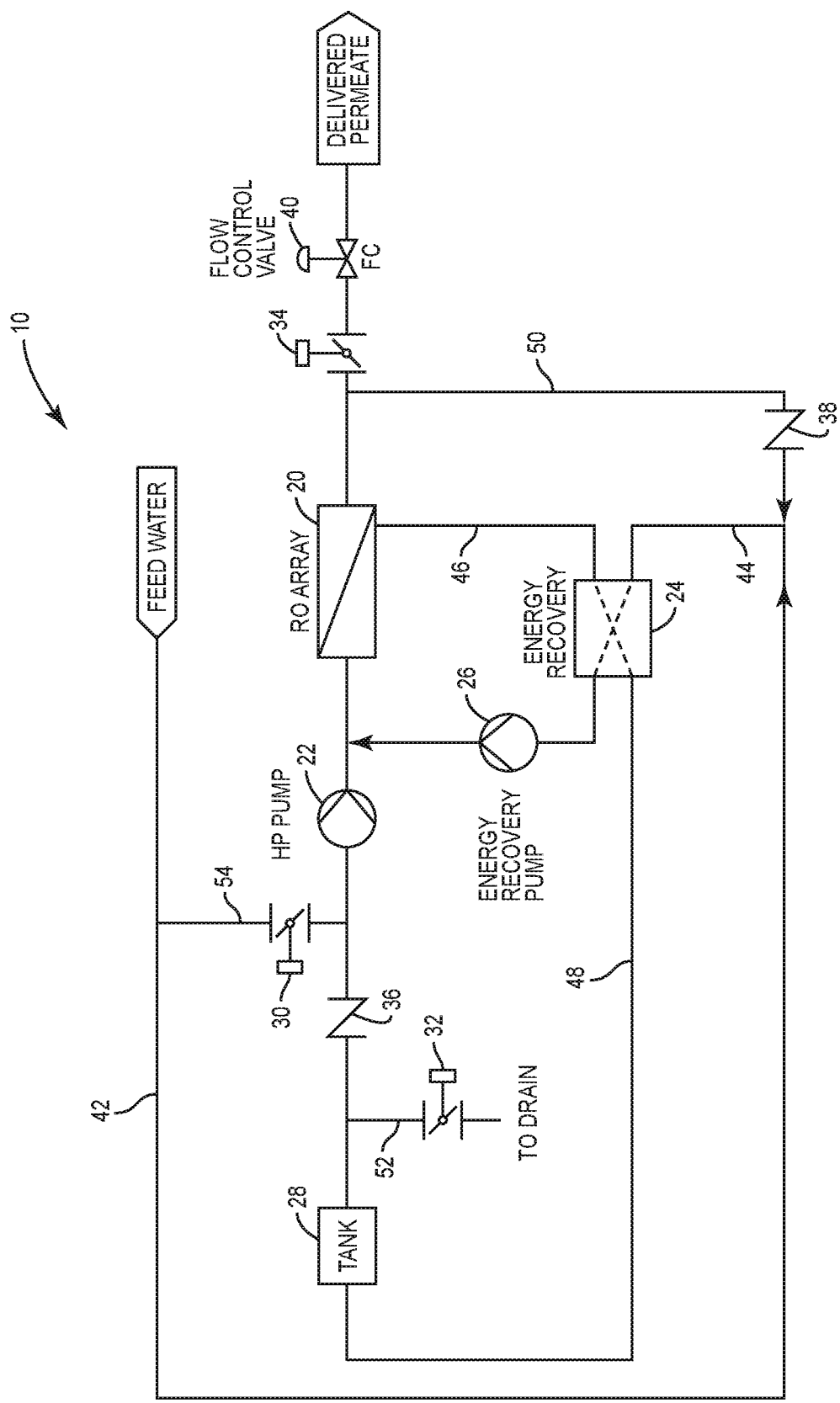
FIG. 1 is a schematic illustration of a water treatment system employing a reverse osmosis array or nanofiltration unit.

With further reference to FIG. 1, the water treatment system of the present invention is shown therein and indicated generally by the numeral 10. First, the basic components of the water treatment system 10 will be described and thereafter the method or process carried out by the water treatment system will be discussed.

Water treatment system 10 includes one or more membrane separation units 20. In the embodiments shown in FIG. 1, the membrane separation unit 20 comprises a reverse osmosis array. In the embodiments shown in FIGS. 2-4, described subsequently herein, the membrane separation unit may include either reverse osmosis or nanofiltration units. The embodiment shown in FIG. 1 will first be described.

Reverse osmosis array 20 can include a single stage or module RO unit which would yield approximately a 50% recovery rate or a two-stage reverse osmosis arrangement that would yield approximately a 75% recovery rate. Additional stages can be employed to increase the recovery rate. Upstream of the reverse osmosis array 20 is a high pressure pump 22. Water treatment system 10 includes a conventional energy recovery unit 24. As will be explained below, both the concentrate from the reverse osmosis array 20 and, in some cases, the feedwater to the reverse osmosis array pass through the energy recovery unit 24. Energy associated with the concentrate leaving the reverse osmosis array 20 is effectively transferred to the feedwater passing through the energy recovery unit 24. Operatively connected between the energy recovery unit 24 and the inlet side of the reverse osmosis array 20 is an energy recovery pump 26. Energy recovery pump 26 is operative to pump the feedwater leaving the energy recovery unit 24 to the reverse osmosis array 20.

Upstream from the high pressure pump 22 is a low pressure concentrate tank or accumulator 28. In some cases, the low pressure concentrate tank or accumulator 28 is referred to as a concentrate holding tank. Low pressure concentrate tank or accumulator 28 is closed and is pressurized. While the pressure can vary in the low pressure concentrate tank or accumulator 28, the pressure therein is maintained at a lower pressure than the pressure on the outlet side of the high pressure pump 22. In one example, the pressure in the low pressure concentrate tank or accumulator 28 can be maintained at approximately 30 psi. It is appreciated that a tank is not required. In lieu of a tank, the piping upstream of the high pressure pump 22 can simply be enlarged to accumulate and hold concentrate.

Water treatment system 10 may include a number of flow control valves for controlling the flow of feedwater, concentrate and permeate through the system. In the embodiment illustrated in FIG. 1, the water treatment system 10 includes automatic control valves 30, 32 and 34. In addition, there is provided check valves 36 and 38. Check valve 36 only permits flow from left-to-right and check valve 38 only permits flow from right-to-left, as viewed in FIG. 1.

Water treatment system 10 is designed to provide a permeate stream to a customer or to a selected delivery point. Note in FIG. 1 the notation "delivered permeate". Just upstream of that is a flow control valve 40 that is disposed downstream of the automatic control valve 34. As will be discussed below, by selectively adjusting the flow control valve 40, one can control the flow rate of the permeate delivered by the system.

Water treatment system 10 is designed to operate in two basic modes. The first mode is referred to as a normal operating mode. The second mode is referred to as a concentrate discharge or drain mode.

Initially, in the first normal operating mode, valves 30, 32 and 34 are closed. A pressurized feedwater, that is pressurized water, is directed into the system via line 42. The feedwater in line 42 is prevented from passing through check valve 38. Consequently, the pressurized feedwater enters line 44 and passes through the energy recovery unit 24. Feedwater exiting the energy recovery unit 24 is pumped by the energy recovery pump 26 into and through the RO array 20. This produces a permeate and a concentrate. Since at this point in time the automatic control valve 34 is closed, the permeate leaving the reverse osmosis array 20 is directed through line 50, through check valve 38 where the permeate mixes with the feedwater in line 42 and the mixture is directed through the energy recovery unit 24 where the energy recovery pump 26 pumps the same into and through the RO array 20. This flow pattern for the feedwater and the permeate continues for some time. Meanwhile, the concentrate produced by the reverse osmosis array 20 is directed through line 46 and through the energy recovery unit 24 into line 48 that delivers the concentrate to the low pressure concentrate tank or accumulator 28. The low pressure concentrate tank or accumulator is sealed which maintains the residual pressure from the energy recovery device 24. Concentrate in tank or accumulator 28 is at sufficient pressure to induce the concentrate to pass through check valve 36 to the high pressure pump 22 which pumps the concentrate into and through the reverse osmosis array 20. It is appreciated that the concentrate exiting the high pressure pump 22 mixes with the effluent from the energy recovery pump 26 and the total mixture is pumped into and through the reverse osmosis array 20.

During the initial period of the first mode of operation, the quality of the permeate is sensed or tested. Once the quality of the permeate produced by the reverse osmosis array 20 reaches an acceptable quality, then the automatic control valve 34 is opened. The downstream flow control valve 40 is set to deliver a certain permeate flow rate to a customer or to a downstream location. It should be noted that the high pressure pump 22 is controlled by a controller such as a PLC and in one embodiment is controlled to maintain a constant flow of permeate from the reverse osmosis array. It follows that the total permeate flow exiting the reverse osmosis array 20 is measured and used by the controller in order to control the high pressure pump 22 so that the total permeate flow is generally constant. The flow rate of the permeate from the reverse osmosis array may exceed the flow rate of permeate that passes through the flow control valve 40 to the customer. This means that a portion of the produced permeate is recycled through the reverse osmosis array 20 via lines 50 and 44 and on through the energy recovery unit 24 to where it is pumped back to the reverse osmosis array by the energy recovery pump 26.

Therefore, in this first mode of operation, a high water recovery rate (at least a 50% recovery rate) is achieved with constant permeate flow and, at the same time, the feedwater flow into system 10 is essentially equal to the water delivered to the customer. However, the flow of permeate to the customer or downstream from the flow control valve 40 can be varied, in which case the flow rate of permeate recycled through the reverse osmosis array 20 will vary.

Eventually, however, the concentrate delivered to the low pressure concentrate tank or accumulator 28 will become so concentrated that discharge or drainage is required. There are various ways to measure the concentration of the concentrate and various thresholds or set points can be established. One appropriate means is subjecting the concentrate to a conductivity test and once the conductivity has reached a set point, then the water treatment system 10 will be automatically switched to the second mode of operation which entails discharging or draining at least some of the concentrate from the low pressure concentrate tank or accumulator 28. In this second mode of operation, control valves 30 and 32 are open. Here the concentrate in tank or accumulator 28 is held under low pressure. A portion of the concentrate will be induced to flow from the tank or accumulator 28 into line 52 and through automatic control valve 32. The concentrate being drained can be further treated or disposed of in appropriate ways. During this time, the pressurized feedwater is directed through line 54 and through automatic control valve 30 to the high pressure pump 22. Effectively, the high pressure pump 22 induces the feedwater to flow through line 54 into the inlet side of the high pressure pump 22. Thus, while a portion of the concentrate is being drained from the tank or accumulator 28, the water treatment system continues to operate with the feedwater now being directly directed into the high pressure pump 22 and to and through the reverse osmosis array 20. Still, even while a portion of the concentrate is being drained from the tank or accumulator 28, the reverse osmosis array 20 is producing a permeate stream and at least a portion of this permeate stream can be delivered through the flow control valve 40 to a downstream location and again a portion of the permeate can be recycled through line 50, check valve 38, line 44, energy recovery unit 24 and on through the energy recovery pump 26 and back to the reverse osmosis array 20. Thus, at the same time, the reverse osmosis array 20 is continuing to produce a concentrate that is directed through line 46, through the energy recovery unit 24 and back to the tank or accumulator 28. In a preferred embodiment, the flow of concentrate through the tank or accumulator 28 is a plug flow so that the concentrate in the tank or accumulator is displaced by the lower concentrated water arising from treating the feedwater only or a blend of feedwater and permeate. During the second mode of operation, the concentrate in the tank or accumulator 28 becomes less concentrated. In other words, the fresh concentrate being delivered to the tank or accumulator 28 is, at least at the beginning, less concentrated than the concentrate in the tank or accumulator 28. In any event, the concentration is continuously monitored and at some point it is appropriate to switch the water treatment system 10 back to the first mode or the normal operating mode. That is, through a conductivity test, for example, the concentrate in the tank or accumulator 28 can be analyzed and when the conductivity reaches a set point that permits the first mode of operation, then the water treatment system 10 can be automatically switched to the first mode of operation by automatically controlling the various valves discussed. In the alternative, the second mode or concentrate discharge mode can be operated for a set period of time and after the lapse of the set period of time, the system can be switched back to the first mode of operation.

In some cases, the flow control valve 40 is continuously or intermittently controlled by the customer. For example, the customer may have a permeate holding tank downstream of the flow control valve 40. Flow control valve 40 can be varied and controlled through a level sensor in the permeate holding tank. Thus, if the level of permeate in the permeate holding tank is rising, this results in the flow control valve being actuated to restrict the flow through the valve. This would not necessarily require the flow control valve to be totally closed as would normally occur with some reverse osmosis systems. This will result in the recirculation of some portion of the permeate from 0% to 100%, depending on the customer's water usage or water demand. This mode of operation permits the RO system to provide an automatic variable permeate flow rate while maintaining a high level of water recovery which is generally not available due to the need to maintain a minimum crossflow velocity within the reverse osmosis modules.

There are many advantages to the reverse osmosis system described above. First, the system and process achieves a high water recovery with generally constant permeate flow. The term "generally constant permeate flow" means that over a selected period of time the flow rate of the permeate varies 5% or less. Secondly, the system and process achieves a high water recovery with a constant feedwater flow. Finally, the system and process achieves the same high water recovery with a variable permeate delivery.

Figure 2:
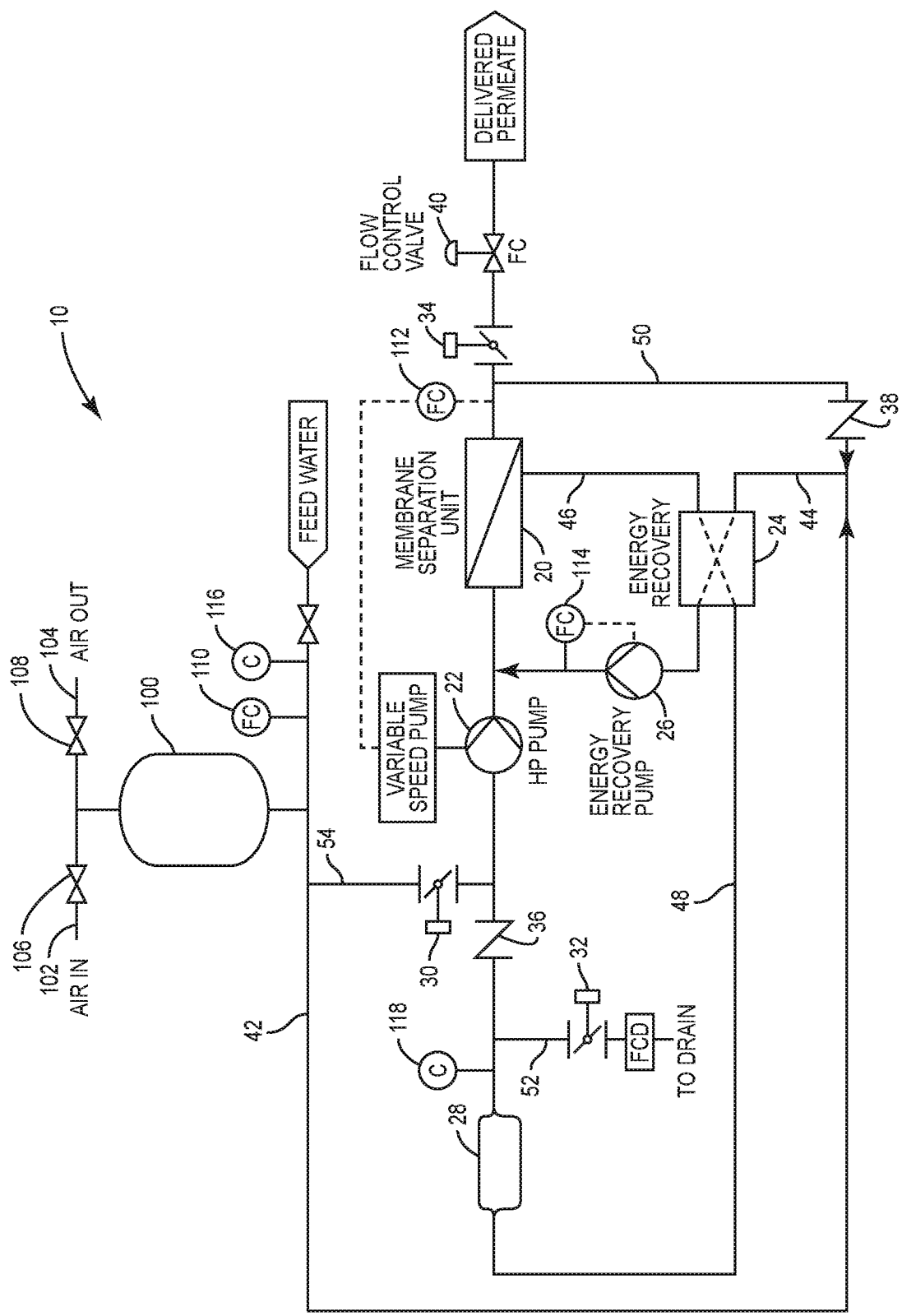
FIG. 2 is a schematic illustration of another embodiment of the water treatment system employing one or more membrane separation units.

FIG. 2 depicts an alternative system and process for treating water with one or more membrane separation units. The system and process disclosed in FIG. 2 is substantially similar to that described above and shown in FIG. 1. There are, however, a number of differences between the two processes.

With respect to FIG. 2, there is provided a feedwater tank or vessel 100 operatively connected in the feedwater inlet line. The function of the feedwater tank 100 is to store some of the feedwater and at selected times discharge that stored feedwater into the system. There can be times when the flow of inlet feedwater is insufficient for the system to optimally operate. More particularly, it is not always practical to suddenly increase the flow of feedwater to the system. Thus, the stored feedwater in tank 100 provides additional feedwater that might be required or demanded by the system at various times to operate efficiently and as intended. Note that there are a pair of air lines operatively associated with the feedwater tank 100. An inlet air line 102 and an outlet air line 104 are operative to direct air into and out of the feedwater tank 100. To control the flow of air under accumulate and discharge conditions, there is provided two valves 106 and 108.

Tank 100 may assume various modes. In one mode, inlet feedwater is directed into the tank. In a second mode, tank 100 simply holds and contains the feedwater. In a third mode, the contained feedwater or a portion thereof is discharged from the feedwater tank 100 into the system. To accumulate feedwater, valve 106 is closed and valve 108 is open. Thus, during the accumulation mode, air is exhausted out line 104. When the feedwater tank 100 is discharging feedwater, valve 108 is closed and valve 106 is open. In this situation, compressed air is directed into line 102 and the compressed air drives the accumulated feedwater from the feedwater tank 100 into the system.

The system and process shown in FIG. 2 includes a number of control elements for controlling the flow of feedwater, permeate and concentrate through the system 10. More particularly, there is shown a series of flow controllers denoted FC. Details of the flow controller are not shown and discussed herein because such is not per se material to the present invention and furthermore, flow controllers are known and used by people ordinarily skilled in the art in membrane systems. In any event, a flow controller FC typically includes a flow sensor for sensing the flow rate of a liquid through a pipe or conduit, for example. In addition, a flow controller may typically include a controller that exercises control over the flow that is being measured by the flow sensor. Typically such controllers are operatively associated with a pump, such as a variable speed pump, and are programmed to control the pump so as to produce a designed or predetermined flow rate. In FIG. 2, there is shown three flow controllers 110, 112 and 114. Flow controller 110 in the embodiment illustrated in FIG. 2 is located in the inlet feedwater line and in this particular case is disposed upstream of the feedwater tank 100. Flow controller 110 in the feedwater line is used in conjunction with the product flow to determine the hydraulic recovery of the system and thus initiate the flushing cycle. Flow controller 112 is operatively connected in the permeate line that extends from the membrane separation unit 20. It is operatively connected to the variable speed pump 22 that is located upstream from the membrane separation unit 20. Flow controller 112 is operative to control the high pressure pump 22 so as to produce a generally constant permeate flow from the membrane separation unit 20. Flow controller 114 is disposed just downstream of the energy recovery pump 26. It is operatively connected with the energy recovery pump 26 so as to control and vary the flow rate of the water passing from the energy recovery pump 26 towards the line that connects the high pressure pump 22 with the membrane separation unit 20. In addition, there is provided a flow control device FCD that is disposed in the drain line 52 just downstream of the automatic control valve 32. This flow control device is used to control the discharge of concentrate through line 52.

System 10 in FIG. 2 also includes a series of conductivity sensors C. Conductivity sensors C function to sense and determine the conductivity in the feedwater or concentrate and are especially useful in determining when the system should be shifted from mode 1 to mode 2 and vice versa. Note that there is a conductivity sensor 116 disposed in the feedwater inlet line. In addition, there is another conductivity sensor 118 that is disposed just downstream of the concentrate accumulator 28 which, as discussed before, can comprise a tank or an enlarged pipe or other device that can hold and retain accumulated concentrate. In a typical system, these conductivity sensors are operatively connected to a main system control unit and provides conductivity measurements to the system control unit which in turn uses that information or data to determine when the system should be switched from mode 1 to mode 2 and vice versa.

Figure 3:
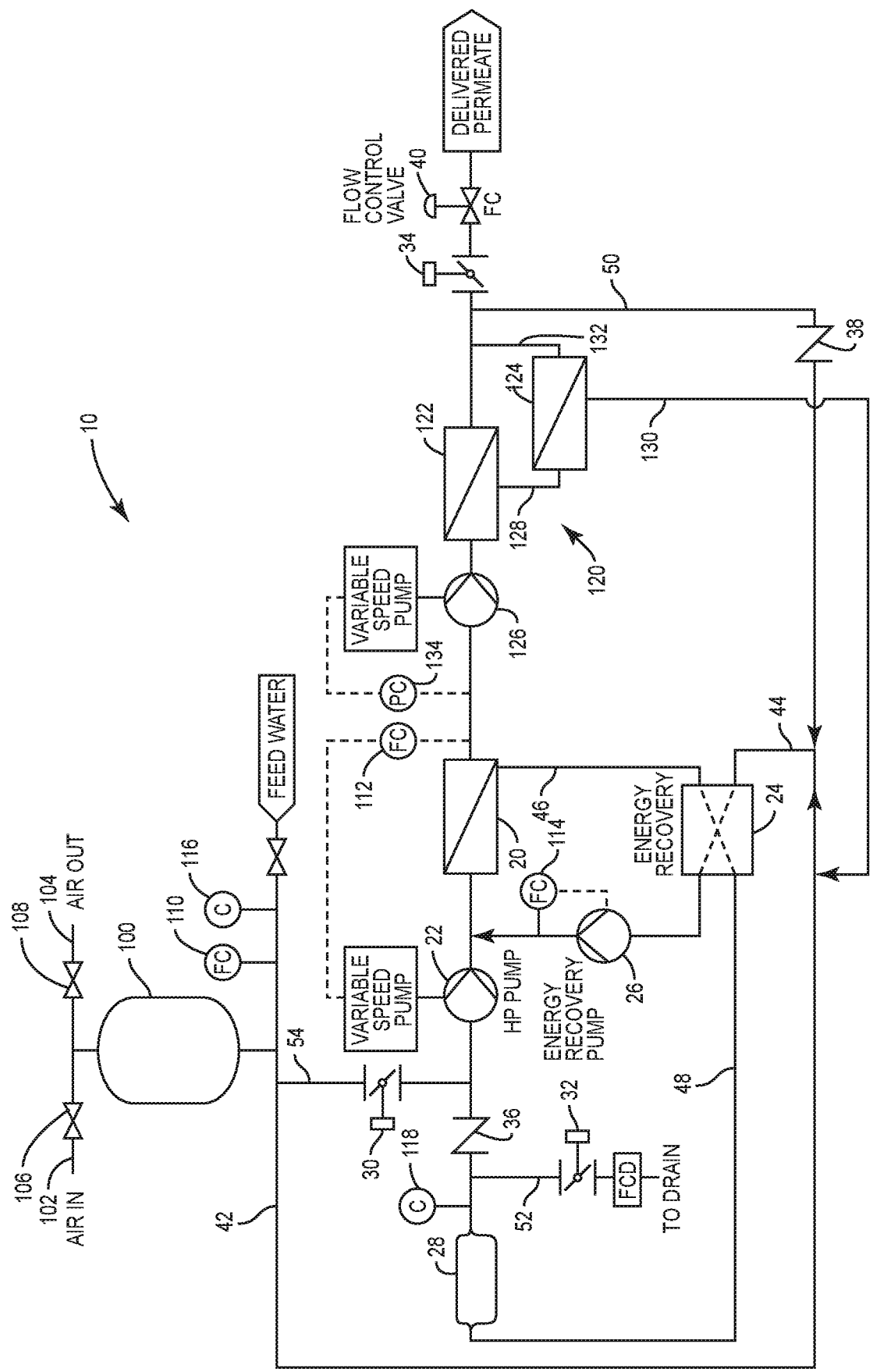
FIG. 3 is a schematic illustration of another embodiment of the water treatment system employing a two stage membrane separation system.

Turning to FIG. 3, another embodiment is shown entailing a system and process for treating a feedwater in a system including reverse osmosis or nanofiltration units. The system and process shown in FIG. 3 is substantially similar to that described above and shown in FIG. 2. The main distinction is that the system and process shown in FIG. 3 includes a two pass membrane system. This embodiment is useful in cases where there is a need for a relatively high recovery rate and/or the purity requirement for the permeate is relatively high.

Turning to FIG. 3, note that the first pass membrane separation unit is indicated by the numeral 20. The second pass membrane separation unit is indicated generally by the numeral 120. More particularly, the second pass membrane separation unit includes membrane separation units 122 and 124.

Permeate from the membrane separation unit 20 is directed to a high pressure variable speed pump 126. Pump 126 directs the permeate into membrane separation unit 122. Membrane separation unit 122 produces a permeate and a concentrate. The concentrate produced by membrane separation unit 122 is directed into line 128 that is in turn fed into membrane separation unit 124. Membrane separation unit 124 also produces a permeate and a concentrate. The permeate from membrane separation unit 124 is directed into line 132 that joins the permeate produced by membrane separation unit 122. The concentrate produced by membrane separation unit 124 is directed into line 130 and is recycled and fed into line 42 where the concentrate is mixed with the inlet feedwater.

To control the permeate flow produced by membrane separation units 122 and 124, there is provided a pressure controller 134. Note in FIG. 3 where the pressure controller 134 is positioned upstream of pump 126. Pressure controller 134 is operatively connected with the high pressure variable speed pump 126. This pressure control loop comprising the pressure controller 134 and the variable speed pump 126 acts to control the VFD of the pump.

Figure 4:
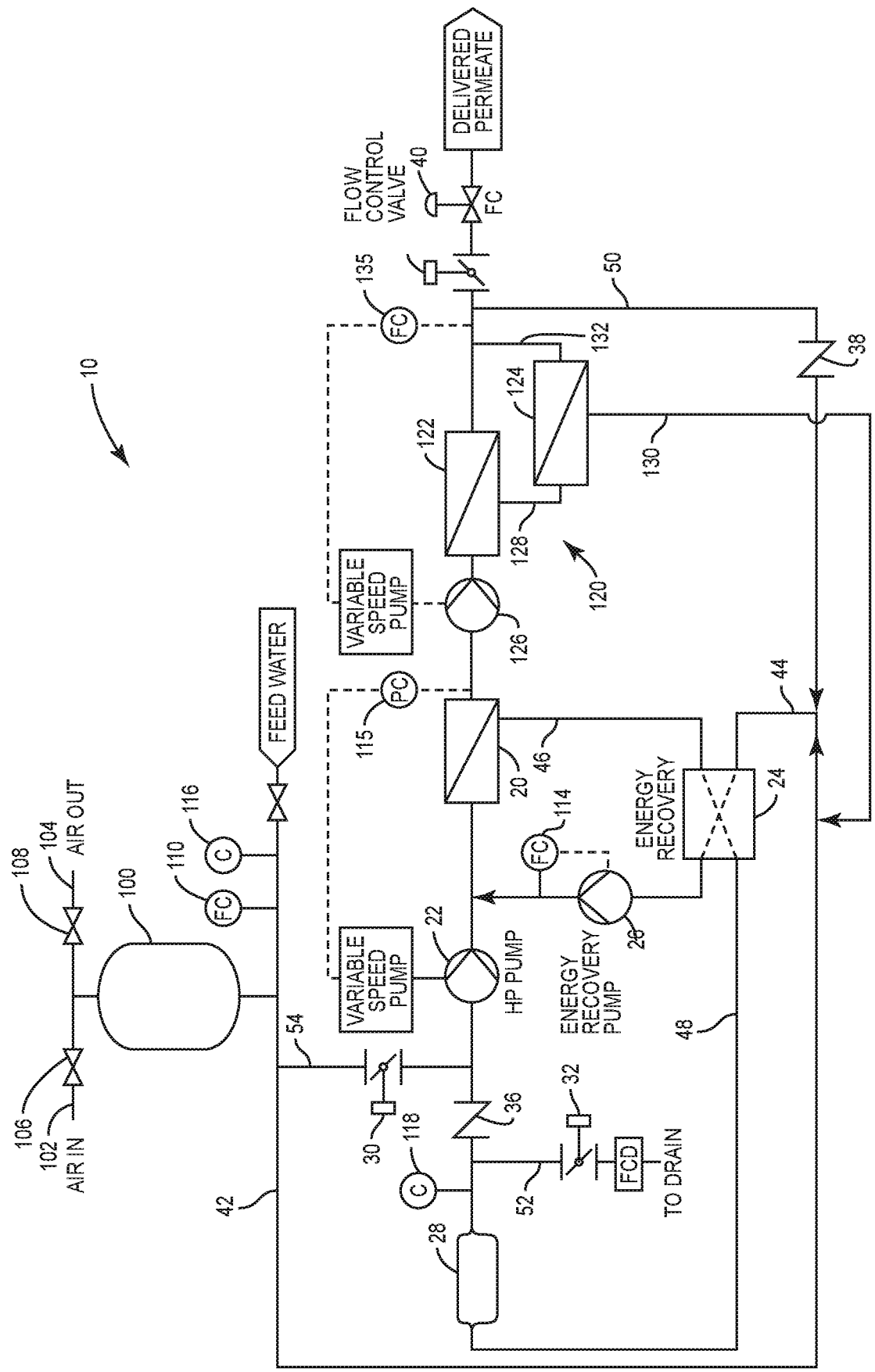
FIG. 4 is yet another schematic illustration of another embodiment of the water treatment system employing a two stage membrane separation process.

FIG. 4 is substantially similar to the system and process shown in FIG. 3. However, in this case, there is a flow controller 135 that is positioned downstream of the membrane separation units 122 and 124. The flow controller 135 is operatively associated with the high pressure variable speed pump 126 and functions to control the flow rate of the permeate produced by the membrane separation units 122 and 124. The process shown in FIG. 4 is an alternative control approach where the first pass RO or nanofiltration unit is operated under pressure control (pressure controller 115) to produce a suction pressure to the second pass pump 126 and the second pass pump operates on a flow control based on the flow controller 134 that is operative to control the second pass high pressure pump 126.

There are various ways and means to operate and control the system and process described above and depicted in FIGS. 1-3. However, the process centers around treating the feedwater in a membrane system that is operated in the first and second modes discussed above. Generally speaking, it is contemplated that in the course of treating feedwater, as described above, that the mode 1 operation will generally last between 20 and 90 minutes. The mode 2 process is contemplated to be relatively short, from approximately 1 minute to 5 minutes. Generally, the control for switching between modes 1 and 2 can be based on measured conductivity of the concentrate by conductivity sensor 118. See FIGS. 2-4. There can be two conductivity thresholds or set points, one that triggers a shift from mode 1 to mode 2 and a second that triggers a shift from mode 2 to mode 1. These thresholds or set points can vary, depending on feedwater quality, application and the customers use of the treated feedwater. There can be other control schemes that are superimposed on a primary control scheme such as the one discussed above and based on conductivity. For example, there can be a timer override. Here, irrespective of the conductivity measured by conductivity sensor 118, the system can be programmed to switch from mode 1 to mode 2 and back to mode 1 based on preselected time intervals. In addition, a third level of control can be based on volumetric recovery. Volumetric recovery is simply the total permeate flow rate divided by the total inlet feedwater flow rate. All three of these parameters can be integrated to control the system and processes discussed above and shown in FIGS. 1-4. Alternatively, either one or various combinations of these control parameters can be employed.

The system and process described above and shown in FIGS. 1-4 entail high pressure and low pressure areas. That is, the piping or conduits in the system will include water under high pressure and some piping or conduits will include water or concentrate under low pressure. For purposes of the systems and processes shown in FIGS. 1-4, the term "high pressure" means a pressure in the range of 100 psi to 1600 psi. The term "low pressure" means a pressure less than 100 psi. More particularly in the case of the embodiments shown herein, the pressure of the feedwater in the line between high pressure pump 22 and the first membrane separation unit 20 is in the range of 100-1600 psi. The pressure on the inlet side of the high pressure pump 22 is typically 20 psi to less than 100 psi. In one embodiment, for example, the pressure just downstream of the tank or accumulator 28 is approximately 20 psi. Therefore, it is appreciated that the high pressure zone or area of the system shown in FIG. 1, for example, includes the line from the high pressure pump 22 to the membrane separation unit 20, as well as a portion of line 46 extending between the membrane separation unit 20 to the energy recovery unit 24, as well as the line from the energy recovery unit 24 through the high pressure pump 26 to the line that extends between the high pressure pump 22 and the membrane separation unit 20. Outside of this, the remaining portion or zone of the system is deemed low pressure. More particularly, the tank or accumulator 28 in the embodiments shown in FIGS. 1-3 lies outside of the high pressure area and is maintained at low pressure. In some cases, the system of the present invention refers to a high pressure zone and a low pressure zone. Consistent with the definition of the terms "low pressure" and "high pressure", a low pressure zone is a zone where the water in the system is maintained at a pressure less than 100 psi. A high pressure zone is a zone in the system where the pressure of the water is maintained in the range of 100-1600 psi.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A process for treating a feedwater in a system including a reverse osmosis (RO) or nanofiltration unit and a concentrate accumulator, the process comprising:
   a. in a first mode of operation:
      i. wherein the RO or nanofiltration unit produces a permeate and a concentrate;
      ii. directing the concentrate to the concentrate accumulator and accumulating the concentrate therein;
      iii. splitting the permeate into first and second permeate streams;
      v. mixing the feedwater with the second permeate stream to form a feedwater-permeate mixture;
      vi. after mixing the feedwater with the second permeate stream, directing the concentrate from the concentrate accumulator and mixing the feedwater-permeate mixture with the concentrate to form a second mixture;
      vii. pressurizing and pumping the second mixture through the RO or nanofiltration unit and producing the first and second permeate streams and the concentrate and continuing to direct the concentrate to the concentrate accumulator;
      viii. wherein during the first mode of operation, neither the feedwater nor the first or second permeate streams are directed into the concentrate accumulator;
   b. in a second mode of operation:
      i. draining a portion of the concentrate from the concentrate accumulator;
      ii. while draining a portion of the concentrate from the concentrate accumulator, pressurizing and directing the feedwater-permeate mixture through the RO or nanofiltration unit and continuing to produce the concentrate;
      iii. while draining a portion of the concentrate from the concentrate accumulator, continuing to direct concentrate from the RO or nanofiltration unit into the concentrate accumulator;
      iv. wherein during the second mode of operation, neither the feedwater nor the first or second permeate streams are directed into the concentrate accumulator; and
   c. wherein the process is a continuous process that continues to direct concentrate from the RO or nanofiltration unit into the concentrate accumulator in both the first and second modes.

2. The process of claim 1 wherein, during the first mode of operation, the feedwater-permeate mixture is directed to a high pressure side of a pump disposed upstream of the RO or nanofiltration unit; and in the second mode of operation, the process comprises directing the feedwater to a low pressure side of the pump.

3. The process of claim 2 including, during the second mode of operation, directing the second permeate stream to the high pressure side of the pump where the second permeate stream is mixed with the feedwater on the high pressure side of the pump.

4. The process of claim 3 including in the first mode of operation directing the feedwater-permeate mixture to a high pressure side of a pump; and in the second mode of operation changing the flow pattern of the feedwater and directing the feedwater to a low pressure side of the pump before mixing the feedwater and the second permeate stream; and in the second mode of operation directing the second permeate stream to the high pressure side of the pump and mixing the feedwater and second permeate stream on the high pressure side of the pump.

5. The process of claim 1 wherein during the first mode of operation, the process includes pressurizing the concentrate accumulator and directing the concentrate under pressure from the concentrate accumulator to a pump operatively connected between the concentrate accumulator and the RO or nanofiltration unit.

6. The process of claim 1 wherein the concentrate produced by the RO or nanofiltration unit flows into and through the concentrate accumulator and wherein the flow of concentrate through the concentrate accumulator is a plug flow.

7. The process of claim 1 wherein in the first mode of operation, the process includes directing the feedwater-permeate mixture through an energy recovery device and after exiting the energy recovery device, the feedwater-permeate mixture is mixed with the concentrate from the concentrate accumulator.

8. The process of claim 1 wherein a pump is operatively connected between the concentrate accumulator and the RO or nanofiltration unit; and wherein the process includes maintaining the pressure of the second mixture in a line between the pump and the RO or nanofiltration unit at 1000-1600 psi; and maintaining the pressure in the concentrate upstream of the pump at less than 100 psi.

9. The process of claim 1 including directing the feedwater-permeate mixture through an energy recovery device through which the concentrate from the RO or nanofiltration unit flows; and after the feedwater-permeate mixture exits the energy recovery device, combining the feedwater-permeate mixture with the concentrate at a point upstream of a pump disposed between the concentrate accumulator and the RO or nanofiltration unit.

\* \* \* \* \*